May 10, 1932.     C. W. LINDE     1,858,098
TIRE TOOL
Filed April 17, 1931
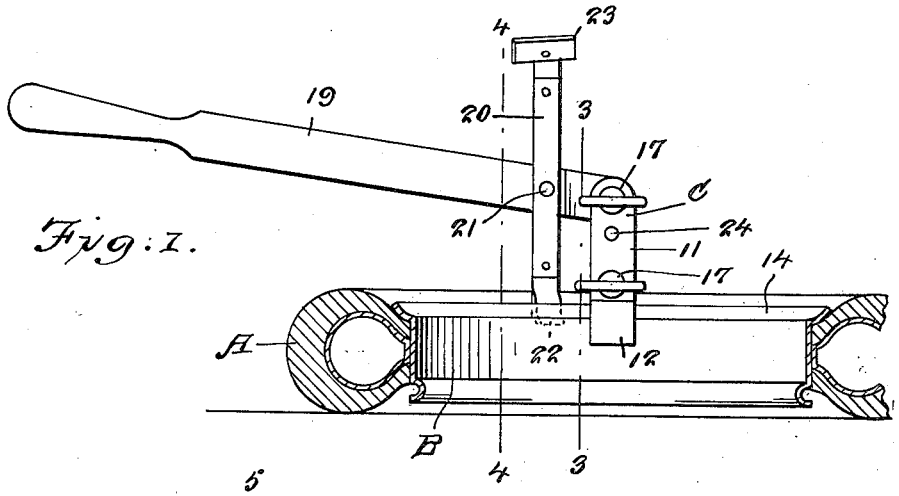
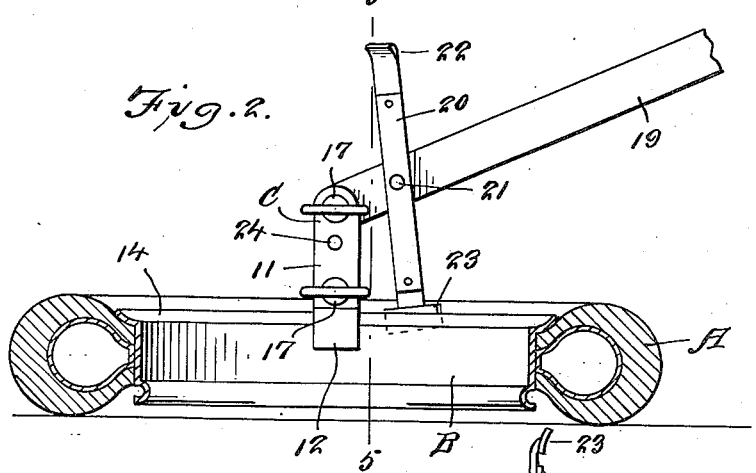
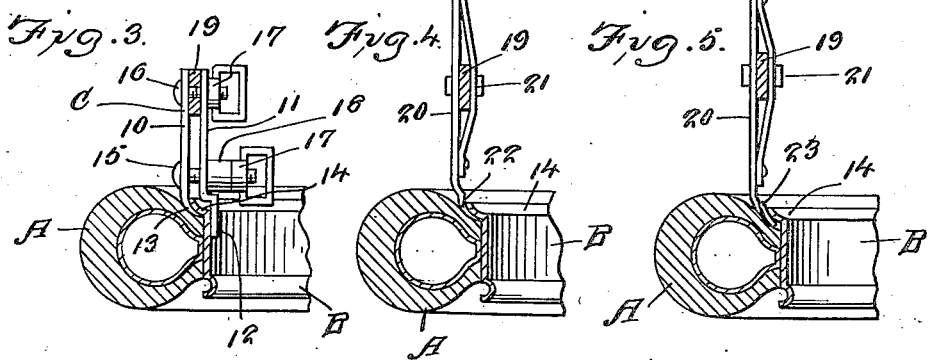
C. W. Linde
INVENTOR
BY Victor J. Evans
and Co    ATTORNEY Patented May 10, 1932

1,858,098

UNITED STATES PATENT OFFICE

CHARLES W. LINDE, OF VINELAND, NEW JERSEY

TIRE TOOL   REISSUED

Application filed April 17, 1931. Serial No. 530,970.

The invention relates to a tire tool.

An object of the invention is the provision of a tool of this character wherein a tire casing can be quickly and easily broken away from the rim, especially where a tire casing has been carried thereon for a considerable length of time, the tool being of novel construction so as to present separate working tips without requiring the removal of the tool from the rim after its application thereto.

A further object of the invention is the provision of a tool of this character which is comparatively simple in construction, readily and easily applied to and removed from a tire rim and when applied is susceptible of easy operation for the loosening of the tire casing from the rim, thoroughly reliable and efficient in its purpose, strong, durable and inexpensive to maufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a fragmentary sectional view through a tire and rim showing the tool constructed in accordance with the invention applied to the rim with the tire iron in position to become active upon the tire casing.

Figure 2 is a view similar to Figure 1 showing the tire iron reversed and in position for action upon the tire casing.

Figure 3 is a fragmentary sectional view taken on the line 3—3 of Figure 1 looking in the direction of the arrow.

Figure 4 is a sectional view on the line 4—4 of Figure 1.

Figure 5 is a sectional view on the line 5—5 of Figure 2.

Similar reference characters indicate corresponding parts throughout the several views in the drawings.

Referring to the drawings in detail, A designates generally a portion of a tire casing and B a portion of the rim which is of the demountable type.

The tire tool comprises a clamping support or leg C which comprises an outer clamping plate 10 and an inner clamping plate 11, the latter being formed with an offset terminal 12 which constitutes a jaw to engage the inner peripheral surface of the rim B, while the outer plate 10 is provided with a claw 13 which is curved inwardly in the direction of the terminal 12 and is designed to engage the inside of flange 14 of the rim B to coact with said terminal 12 for the clamping of the support or leg C upon the rim. These plates 10 and 11 have fitted transversely therein spaced bolts 15 and 16 respectively, carrying threaded binding nuts 17 thereon, the bolt 15 being fitted with a spacer sleeve 18 against which works the nut 17 and this bolt 15 with the nut 17 and sleeve 18 thereon serves for the clamping of the terminal 12 and the claw 13 to the rim B for the positioning and securing of the support or leg C thereon as clearly shown in Figures 1, 2 and 3 of the drawings.

The bolt 16 constitutes a pivot for an operating lever 19, the latter being disposed at its pivoted end between the plates 10 and 11 and this lever has connected therewith a tire iron 20 hereinafter described.

The tire iron 20 is pivoted at 21 medially thereof to the lever 19 at a distance removed from the pivotal connection of the lever with the support or leg and one end of this iron is provided with a curved claw-like tip 22 while the opposite end of said iron has mounted thereon a curved crosshead 23 which constitutes a working tip at this end of the iron.

In the use of the tool, the support or leg C is engaged with the rim B at any point circumferentially thereof and such support or leg can be adjusted on the peripheral edge of said rim as the occasion may require. In use the lever 19 of the tool is swung either to one side or the other of the support or leg C to bring the working tip 22 or 23 into position to penetrate between the flange 14 and the bead or side of the tire casing A, then on depressing the lever 19 this tip so positioned will work into the space formed thereby between said flange and tire casing so as to break or separate the tire casing A from the rim B.

The user of the tool is privileged to select either working tip 22 or 23 for the initial use of said tool, but it is preferable to first insert the tip 22 so as to effect a gap or space between the side of the tire A and the flange of the rim B or in other words, breaking loose these confronting portions entirely circumferential of the rim and then reversing the lever 19 of the tool to bring the tip 23 into working position to effect the complete breaking away of the tire casing from the rim.

The plates 10 and 11 are provided with supplemental holes 24 for accommodating the bolt 16 so that the lever 19 can be adjusted at its pivotal point between the plates 10 and 11 to vary the throw of the lever when the tool is in use and this avoiding the contacting of the handle end of the lever with a foundation or floor during the use of said tool.

From the foregoing it is thought that the construction and manner of use of the tool will be clearly understood when taken in connection with the showing in the drawings and therefore a more extended explanation has been omitted.

What is claimed is:—

1. A tool of the character described comprising a swinging lever, a clamping leg adapted to grip one edge of a tire rim carrying a tire to project above the plane of one side thereof and pivotally supporting the lever tangentially to said rim and tire, and a tire iron carried by the lever at one side of its axis of movement and having opposite working tips alternately engageable between the tire and rim.

2. A tool of the character described comprising a swinging lever, a clamping leg adapted to grip one edge of a tire rim carrying a tire to project above the plane of one side thereof and pivotally supporting the lever tangentially to said rim and tire, a tire iron carried by the lever at one side of its axis of movement and having opposite working tips alternately engageable between the tire and rim, and means for permitting adjustment of the lever upon the leg.

In testimony whereof I affix my signature.

CHARLES W. LINDE.